US000001119H

United States Statutory Invention Registration [19]

[11] Reg. Number: H1119

[43] Published: Dec. 1, 1992

Inoue

[54] DIRECT POSITIVE PHOTOGRAPHIC MATERIAL

[75] Inventor: Noriyuki Inoue, Kanagawa, Japan

[73] Assignee: Fuji Photo Film Co., Ltd., Kanagawa, Japan

[21] Appl. No.: 642,954

[22] Filed: Jan. 18, 1991

[30] Foreign Application Priority Data

Jan. 19, 1990 [JP] Japan ..... 2-10421

[51] Int. Cl.[5] ..... G03C 1/485

[52] U.S. Cl. ..... 430/598; 430/264; 430/596; 430/378; 430/547; 430/406; 430/607; 430/613; 430/600

[58] Field of Search ..... 430/598, 264, 596, 378, 430/547, 406, 607, 613, 600

[56] References Cited

U.S. PATENT DOCUMENTS

| | | | |
|---|---|---|---|
| 2,751,297 | 6/1956 | Hood et al. | 430/614 |
| 4,383,072 | 9/1981 | Thiel et al. | 524/432 |
| 4,409,324 | 9/1982 | Ishikawa et al. | 430/546 |
| 4,456,682 | 9/1982 | Ishikawa et al. | 430/523 |
| 4,465,762 | 3/1982 | Ishikawa et al. | 430/376 |
| 4,981,780 | 1/1991 | Inoue et al. | 430/598 |
| 4,996,937 | 2/1991 | Inoue et al. | 430/598 |
| 5,030,553 | 7/1991 | Kawashima et al. | 430/598 |
| 5,037,726 | 8/1991 | Kojiura et al. | 430/598 |

*Primary Examiner*—Robert L. Stoll
*Assistant Examiner*—Joseph D. Anthony
*Attorney, Agent, or Firm*—Sughrue, Mion, Zinn, Macpeak & Seas

[57] ABSTRACT

Disclosed is a direct positive photographic material having an improved time-dependent storage stability. The material comprises a support having thereon at least one photographic emulsion layer containing previously non-fogged internal latent image type silver halide grains wherein the photographic emulsion layer contains at least one compound of formula (I):

(I)

where $R^{11}$ is an aryl group, $R^{12}$ to $R^{15}$ each are a hydrogen atom, or an aliphatic or aromatic group, and $R^{11}$ to $F^{15}$ may have substituent(s) and may form ring(s).

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIRECT POSITIVE PHOTOGRAPHIC MATERIAL

FIELD OF THE INVENTION

The present invention relates to a direct positive photographic material having at least one photographic emulsion layer containing previously non-fogged internal latent image-type silver halide grains. In particular, it relates to a direct positive photographic material having a good time-dependent storage stability.

BACKGROUND OF THE INVENTION

A method of forming a direct positive image is well known, where a direct positive photographic material having a previously non-fogged internal latent image-type silver halide emulsion is imagewise exposed and then subjected to surface-development after or during fogging.

The above-mentioned latent image-type silver halide photographic emulsion means a silver halide photographic emulsion of such a type that the silver halide grains therein have light-sensitive nuclei essentially in the inside thereof and a latent image is formed essentially in the inside of the grains by exposure.

Various techniques have been known in this technical field. For instance, U.S. Pat. Nos. 2,592,250, 2,466,957, 2,497,875, 2,588,982, 3,317,322, 3,761,266, 3,761,276 and 3,796,577 and British Pat. Nos. 1,151,363, 1,150,553 and 1,011,062 illustrates essential techniques of the field.

Using the known methods, direct positive photographic materials having a relatively high sensitivity can be obtained.

The details of the mechanism of forming direct positive images are described, for example, in T. H. James, *The Theory of the Photographic Process,* Ed. 4, Chap. 7, pages 182 to 193 and U.S. Pat. No. 3,761,276.

In order to put a direct positive photographic material into practical use, the material must give a hard (high contrast) image, having a high Dmax and a low Dmin. In general, a direct positive photographic material has drawbacks in that the time-dependent variation of sensitivity during storage (or increase of sensitivity) is large and the aged material often gives an image having a lowered maximum sensitivity. Therefore, elimination of such drawbacks has been desired in preparing a direct positive photographic material.

SUMMARY OF THE INVENTION

An object of the present invention is to provide a direct positive photographic material which is free from the above-mentioned drawbacks. This has been attained by use of a direct positive photographic material comprising a support having provided thereon at least one photographic emulsion layer containing previously non-fogged internal latent image-type silver halide grains, wherein the photographic emulsion layer contains at least one compound of formula (I):

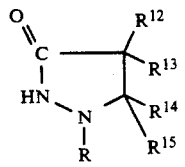

(I)

where $R^{11}$ represents an aryl group; $R^{12}$ to $R^{15}$, which may be the same or different, each represents a hydrogen atom, an aliphatic group or an aromatic group; and $R^{11}$ to $R^{15}$ may form a ring (s).

The aryl group of $R^{11}$, and the aliphatic group or aromatic group of $R^{12}$ to $R^{15}$ may Optionally have substituent(s).

As one preferred embodiment of the direct positive photographic material of the invention, the internal latent image-type silver halide grains in the material are composed of silver bromide, silver chloride, silver iodobromide, silver chlorobromide or silver chloroiodobromide grains, and contain at least one metal selected from the group comprising manganese, copper, zinc, cadmium, rhenium, lead, bismuth, indium, thallium, zirconium, lanthanum, chromium, mercury and metals of Group VIII of the Periodic Table.

As another preferred embodiment of the direct positive photographic material of the present invention, the material has at least one blue-sensitive emulsion layer, at least one green-sensitive emulsion layer and at least one red-sensitive emulsion layer on a support and contains one or more color-image-forming couplers.

DETAILED DESCRIPTION OF THE INVENTION

The aryl group of $R^{11}$ is preferably one having from 6 to 10 carbon atoms, which includes, for example, a phenyl group and a naphthyl group.

The aliphatic group of $R^{12}$ to $R^{15}$ is preferably one having from 1 to 12 carbon atoms, which includes, for example, a $C_{1-12}$ alkyl group, a $C_{2-12}$ alkenyl group, a $C_{2-12}$ alkynyl group or a $C_{7-12}$ aralkyl group. Examples of the alkyl group include a methyl group, an ethyl group, a propyl group, an isopropyl group, a butyl group, a t-butyl group, a hexyl group and a cyclohexyl group. Examples of the alkenyl group include an allyl group and a butenyl group. Examples of the alkynyl group include a propargyl group and a pentynyl group. Examples of the aralkyl group include a benzyl group, a 1,1-dimethylbenzyl group and a phenethyl group.

The aromatic group of $R^{12}$ to $R^{15}$ may be a carbon-cyclic aromatic group or a heterocyclic aromatic group, which has from 1 to 12 carbon atoms. The carbon-cyclic aromatic group is preferably one having from 6 to 10 carbon atoms, which includes, for example, a phenyl group and a naphthyl group. The heterocyclic aromatic group is preferably a 5-membered to 8-membered one, which includes, for example, a furyl group, a thienyl group, a pyrrolyl group, an imidazolyl group and a pyridyl group.

Examples of substituents which may be substituted on the groups of $R^{11}$ to $R^{15}$ include a $C_{1-16}$ alkyl group, a $C_{2-16}$ alkenyl group, a $C_{2-16}$ alkynyl group, a $C_{7-16}$ aralkyl group, a $C_{6-14}$ aryl group, a heterocyclic group, a halogen atom, a hydroxyl group, a sulfon group, a carboxyl group, an amino group, a cyano group, a $C_{1-16}$ alkoxy group, a $C_{6-14}$ aryloxy group, a $C_{1-16}$ alkylthio group, a $C_{6-14}$ arylthio group, a carbamoyl group, a $C_{1-16}$ acylamino group, a sulfonylamino group, a sulfamoyl group, an alkoxycarbonylamino group, a carbamoyloxy group and an ureido group. The heterocyclic group is 3 to 12 membered one containing at least one selected from N, O, S and Se, including, e.g., pyrolidine, pyrrole, furan, tetrahydrofuran, thiophene, oxazole, oxazolidine, thiazole, thiazolidine, imidazole, pyrazole, triazole, tetrazole, thiaziazole, oxadiazole, selenazole, morphorine, pyrizine, pyrolidone, or a heterocyclic ring in which a benzene ring or a heterocyclic ring is condensed to these rings.

Where $R^{11}$ to $R^{15}$ form ring(s), they may form ring(s) individually, or $R^{12}$ and $R^{13}$, or $R^{12}$ and $R^{14}$, or $R^{14}$ and $R^{15}$ and/or $R^{15}$ and $R^{11}$ may be bonded to each other to form ring(s). Such rings may be 5-membered to 8-membered carbon rings and/or hetero rings.

$R^{11}$ is preferably a phenyl group, a p-tolyl group, a m-tolyl group, a m-chlorophenyl group or a p-methoxyphenyl group, and more preferably a phenyl group, a p-tolyl group or a m-tolyl group.

$R^{12}$ and $R^{13}$ each are preferably a hydrogen atom or an alkyl group, more preferably a hydrogen atom, a methyl group or a hydroxymethyl group.

$R^{14}$ and $R^{15}$ each are preferably a hydrogen atom, an alkyl group or a phenyl group, more preferably a hydrogen atom, a methyl group or a phenyl group, most preferably a hydrogen atom.

Specific examples of compounds of formula (I) are set forth below, which, however, are not limitative.

(I-1)

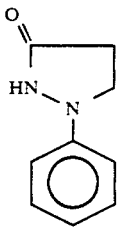

(I-2)

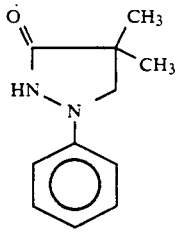

(I-3)

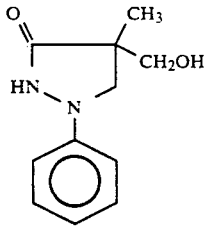

(I-4)

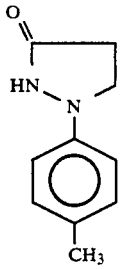

(I-5)

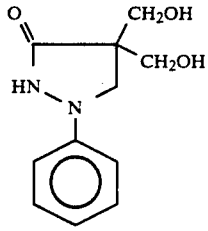

-continued (I-6)

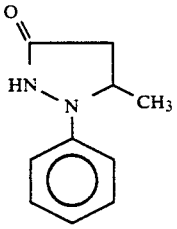

(I-7)

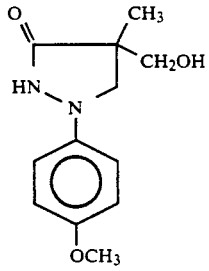

(I-8)

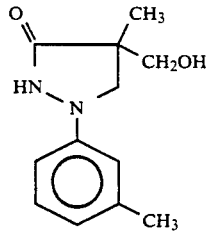

(I-9)

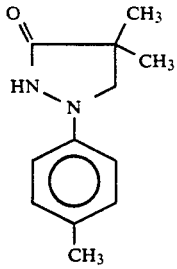

(I-10)

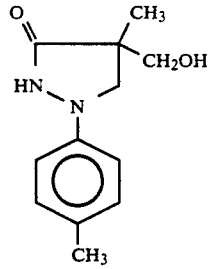

(I-11)

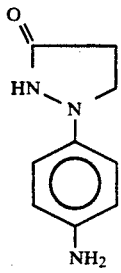

-continued (I-12)

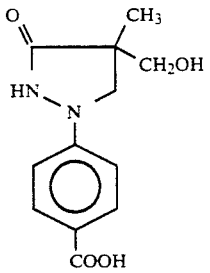

(I-13)

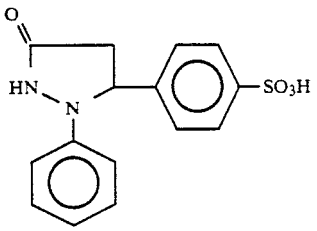

(I-14)

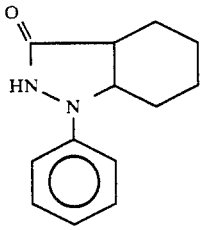

(I-15)

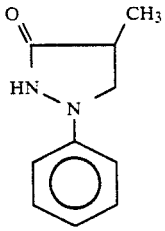

(I-16)

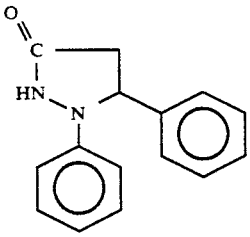

(I-17)

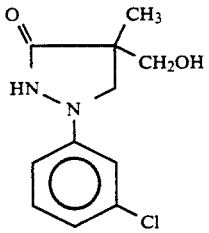

-continued (I-18)

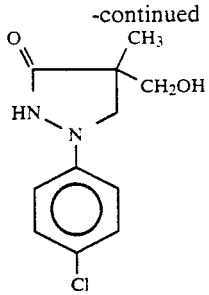

(I-19)

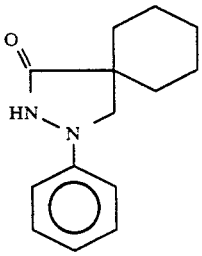

(I-20)

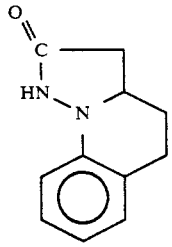

Some compounds of the present invention are commercially available. The compound of the present invention can be synthesized in accordance with U.S. Pat. Nos. 2,688,024, and 2,704,762, JP-A-56-64339 and JP-A-58-50534 (the term "JP-A" as used herein means an "unexamined published Japanese patent application").

When the compounds of formula (I) are incorporated into the photographic material of the invention, they may be added to either non-light-sensitive layers or light-sensitive layers, but are preferably added to light-sensitive layers.

The amount of the compound(s) of formula (I) in the material is preferably from $1\times10^{-7}$ mol to 1'$10^{-2}$ mol, more preferably from $5\times10^{-7}$ mol to $1\times10^{-3}$ mol, especially preferably from $5\times10^{-7}$ mol to $1\times10^{-4}$ mol, per $m^2$ of the material.

The previously non-fogged internal latent image-type silver halide emulsion for use in the present invention is an emulsion containing silver halide grains, the surfaces of which are not previously fogged, and which forms a latent image essentially in the inside of the grains. More concretely, the emulsion may be identified as follows. A silver halide emulsion is coated on a transparent support in a determined amount (0.5 to 3 g/$m^2$), which is exposed for a determined period of from 0.01 second to 10 seconds and then developed with the following developer (A) (internal developer) at 18° C. for 5 minutes, and the maximum density of the image formed is determined by conventional photographic densitometry. In addition, the same silver halide emulsion was coated on the same support in the same manner as above and then exposed also in the same manner as above. The thus exposed material is then developed with the following developer (B) (surface developer) at 20° C., for 6 minutes and the maximum density of the images formed is determined also in the same manner as above. When the value of the maximum density obtained in the former (developed with the internal developer (A)) is at least 5 times, more preferably at least 10 times, of that obtained in the latter (developed with the surface developer (B)), the emulsion tested is an internal latent image-type emulsion.

| | |
|---|---|
| Internal Developer (A): | |
| Metol | 2 g |
| Sodium Sulfite (anhydride) | 90 g |
| Hydroquinone | 8 g |
| Sodium Carbonate (monohydrate) | 52.5 g |
| KBr | 5 g |
| KI | 0.5 g |
| Water to make | 1 liter |
| Surface Developer (B): | |
| Metol | 2.5 g |
| L-ascorbic Acid | 10 g |
| $NaBO_2.4H_2O$ | 35 g |
| KBr | 1 g |
| Water to make | 1 liter |

Examples of internal latent image-type emulsions include, for example, conversion-type silver halide emulsions as described in U.S. Pat. No. 2,592,250, as well as core/shell type silver halide emulsions as described in U.S. Pat. Nos. 3,761,276, 3,850,637, 3,923,513, 4,035,185, 4,395,478 and 4,504,570, JP-A-52-156614, JP-A-55-127549, JP-A-53-60222, JP-A-56-22681, JP-A-59-208540, JP-A-60-107641, JP-A-61-3137 and JP-A-62-215272 and patent publications as mentioned in *Research Disclosure,* No. 23510 (issued in November, 1983), page 236.

The internal latent image-type silver halide grains for use in the present invention may be either in the form of a conversion-type emulsion or in the form of a core/-shell type emulsion, but preferably they have a core/-shell laminate structure in view of the easy controllability of the photographic sensitivity and gradation of the emulsion. Regarding the structure of the core/shell silver halide grain, the core and shell are preferably composed of silver iodobromide, silver chlorobromide, silver chloride or silver chloroiodobromide, which contains silver bromide and 10 mol% or less, preferably 3 mol% or less, silver iodide. The core may be either a so-called conversion type one or a general one. The halogen composition of the core and that of the shell may be the same as or different from each other. As core/shell type structure-having silver halide emulsions, for example, those as described in JP-A-55-127549, U.S. Pat. No. 4,395,478 and West German Patent 2,332,802C2 may be employed on a case by case basis.

The silver halide grains in the photographic material of the present invention preferably contain at least one metal ion selected from the group comprising manganese, copper, zinc, cadmium, lead, bismuth, indium, thallium, zirconium, lanthanum, chromium, rhenium, mercury and metals of Group VIII of the Periodic Table. The amount of the metal(s) in the grains is preferably from $10^{-9}$ to $10^{-2}$ mol, more preferably from $10^{-8}$ to $10^{-3}$ mol, per mol of silver halide.

Of the metals, especially preferred are lead, iridium, rhodium, rhenium, iron and bismuth. Most preferred are lead, iridium and rhodium.

The position of the previously non-fogged internal latent image-type emulsion of the invention, into which the above-mentioned metal(s) is introduced, is not specifically limited.

For incorporating the metal into the silver halide grains, a metal ion in the form of an aqueous solution thereof or an organic solvent solution thereof may be added to the step of forming silver halide grains by blending a silver ion solution and an aqueous halogen solution. Alternatively, a metal ion in the form of an aqueous solution thereof or an organic solvent solution thereof may be added to the grains as already formed and thereafter the resulting grains may be coated further with a silver halide.

The method of incorporating the metal into silver halide grains is described in detail, for example, in U.S. Pat. Nos. 3,761,276 and 4,395,478 and JP-A-59-216136.

The silver halide grains for use in the present invention preferably have a mean grain size of from 0.1 micron to 1.5 microns, especially from 0.2 micron to 1.2 microns. (The grain size indicates a diameter of the grain when the grain is spherical or nearly spherical or indicates a length of the edge of the grain when it is a cubic grain; and the mean grain size indicates a mean value based on the projected area of the grains.) The grain size distribution in the emulsion for use in the present invention may be either narrow or broad, but a so-called "monodispersed" silver halide emulsion which has such a narrow grain size distribution that 90% by weight or by number or more, especially 95% by weight or by number or more, of the total grains has a grain size falling within the range of the mean grain size plus/minus 40%, more preferably plus/minus 30 %, most preferably plus/minus 20%, is preferably employed in the present invention for the purpose of improving the graininess and sharpness of the photographic material. Additionally, in order to satisfy the intended gradation of the photographic material, two or more monodispersed silver halide emulsions each having a different grain size distribution, or plural grains each having the same size but having a different sensitivity may be blended into one and the same layer or may be coated as different layers, in forming an emulsion layer having a substantially same color sensitivity. Additionally, a combination of two or more polydispersed silver halide emulsions or a combination of a monodispersed emulsion and a polydispersed emulsion may be blended into one and the same layer or may be coated as different layers.

The silver halide emulsion for use in the present invention may be chemically sensitized in the inside of the grains or on the surface thereof, by sulfur or selenium sensitization, reduction sensitization and/or noble metal sensitization.

Examples of chemical sensitization are described in detail, for example, in the patent publications as mentioned in *Research Disclosure,* No. 17643-III (issued in December, 1978), page 23.

The photographic emulsion for use in the present invention is color-sensitized with photographic sensitizing dyes by a conventional method. Especially useful dyes for this purpose are cyanine dyes, merocyanine dyes and complex merocyanine dyes, and these dyes may be used alone or in combination with two or more of them. The dyes may be combined with super-color sensitizing agents. Examples of color sensitizing dyes and super-color sensitizing agents which may be employed in the present invention are described in detail, for example, in the patent publications as mentioned in

*Research Disclosure,* No. 17643-IV (issued in December, 1978), pages 23 to 24.

The photographic emulsion for use in the present invention can contain an antifoggant or a stabilizer for the purpose of preventing the emulsion from fogging or for stabilizing the photographic property of the emulsion, during manufacture, storage or photographic processing of the photographic material. Examples of compounds as antifoggants or stabilizers are described in detail, for example, in *Research Disclosure,* No. 17643-VI (issued in December, 1978) and E. J. Birr, *Stabilization of Photographic Silver Halide Emulsion* (published by Focal Press in 1974).

In forming direct positive color images in accordance with the present invention, various color couplers are used. Color couplers are compounds which react with the oxidation product of an aromatic primary amine-type color developing agent by coupling reaction to form or release a substantially non-diffusive dye. Preferably, they are substantially non-diffusive compounds by themselves. Specific examples of useful color couplers include naphthol or phenol compounds, pyrazolone or pyrazoloazole compounds, and open-chain or heterocyclic ketomethylene compounds. Examples of these cyan, magenta and yellow couplers which may be employed in the present invention are described in *Research Disclosure,* No. 17643 (issued in December, 1978), page 25, Item VII-D; ibid., No. 18717 (issued in November, 1979); and JP-A-62-215272; as well as in patent publications as referred to in them.

Additionally, colored couplers which have a function of correcting an unnecessary absorption in the short wavelength range of dyes formed in the photographic material, couplers capable of forming coloring dyes having a pertinent diffusibility, colorless couplers, DIR couplers capable of releasing a development inhibitor with coupling reaction, and polymerized couplers may also be used in the present invention.

As a binder or protective colloid to be used in the emulsion layers or interlayers of the photographic material of the present invention, gelatin is advantageously used, but any other hydrophilic colloid may also be used.

The photographic material of the present invention can contain a color-fogging inhibitor or a color-mixing inhibitor.

Specific examples of these inhibitors are described in JP-A-62-215272, pages 185 to 193.

A coloring enhancer may be used in the present invention for the purpose of improving the coloring capacity of the couplers in the photographic material. Specific examples of compounds of the enhancer are described in JP-A-62-215272, pages 121 to 125.

The photographic material of the present invention may contain an anti-irradiation dye, an anti-halation dye, an ultraviolet absorbent, a plasticizer, a brightening agent, a mat agent, an aerial fogging inhibitor, a coating aid, a hardening agent, an antistatic agent and a slide property-improving agent. Specific examples of the additives are described in *Research Disclosure,* No. 17643, VIII to XIII (issued in December, 1978), pages 25 to 27, and ibid., No.18716 (issued in November, 1979), pages 647 to 651.

The present invention may be applied to a multi-layer multi-color photographic material having at least two layers each having a different color sensitivity on a support. For instance, a multi-layer natural color photographic material may be used, which generally has at least one red-sensitive emulsion layer, at least one green-sensitive emulsion layer and at least one blue-sensitive emulsion layer on a support. The order of forming the layers on a support may freely be selected. As preferred examples of the order of the layers, red-sensitive, green-sensitive and blue-sensitive layers are formed on a support in this order, or green-sensitive, red-sensitive and blue-sensitive layers are on a support in this order. The respective layers mentioned above may be composed of two or more sub-emulsion layers each having a different sensitivity degree; or a non-light-sensitive layer may be present between two or more emulsion layers each having the same color-sensitivity. In general, a cyan-forming coupler is incorporated into a red-sensitive emulsion layer, a magenta-forming coupler into a green-sensitive emulsion layer, and a yellow-forming coupler into a blue-sensitive emulsion layer. As the case may be, however, different combinations may also be employed.

The photographic material of the present invention preferably has other various auxiliary layers, such as a protective layer, an interlayer, a filter layer, an anti-halation layer, a backing layer and a white reflecting layer, in addition to the above-mentioned silver halide emulsion layers.

In preparing the photographic material of the present invention, the photographic emulsion layers and other layers are coated on a support, for example, as described in *Research Disclosure,* No. 17643, VIII (issued in December, 1978), pages 28 or in European Patent 0,102,253 and JP-A-61-97655. The coating method described in *Research Disclosure,* No. 17643, XV, pages 28 to 29 can be utilized.

The present invention may be applied to various color photographic materials.

For instance, it may be applied to color reversal films for slides or televisions, color reversal papers and instant color films, as typical examples. Additionally, it may also be applied to color hard copies for storing images to be formed in full-color duplicators or CRT.

The present invention may also be applied to black-and-white photographic materials for utilizing three coupler mixing photography, as described in *Research Disclosure* No. 17123 (issued in July, 1978).

Further, the present invention may also be applied to black-and-white photographic materials.

Examples of black-and-white (B/W) photographic materials to which the present invention may be applied include B/W direct positive photographic materials (for example, X-ray photographic materials, duplicating photographic materials, micro-photographic materials, picture-taking photographic materials, printing photographic materials) as described in JP-A-59-208540 and JP-A-60-260039.

Fogging of the photographic materials of the present invention may be effected by "light-fogging" and/or "chemical-fogging", which will be explained hereunder.

Precisely, in accordance with "light-fogging" for exposure of the complete surface of the photographic material by fogging exposure, the photographic material is imagewise exposed and then light-fogged after and/or during development of the material. That is, the imagewise exposed photographic material is light-fogged by exposure while the material is dipped in a developer or in a previous bath of development, or after the material has been taken out from the developer or prebath but it is not dried up. Most preferably, the light-fogging by exposure is effected in a developer.

As a light source for the fogging exposure, one having a wavelength falling within the wavelength range to which the photographic material is sensitive may be used. In general, a fluorescent lamp, tungsten lamp, xenon lamp or sun light may be used. Concrete methods of such fogging exposure are described in, for example, British Patent 1,151,363, JP-B-45-12710, 45-12709, 58-6936 (the term "JP-B" as used herein means an "examined Japanese patent publication"), JP-A-48-9727, JP-A-56-137350, JP-A-57-129438, JP-A-58-62652, JP-A-58-60739, JP-A-58-70223 (corresponding to U.S. Patent 4,440,851), JP-A-58-120248 (corresponding to European Patent 89101A2). For photographic materials having a light-sensitivity to lights of all wavelength ranges, for example, color photographic materials, a light source having a high color rendition (preferably, one which is almost nearly white) is desired. The illuminance of the light to be applied to the photographic material is from 0.01 to 2000 lux, preferably from 0.05 to 30 lux, more preferably from 0.05 to 5 lux. Where the photographic material has an emulsion of a higher sensitivity, the illuminance of the light to be applied thereto is preferably lower. Adjustment of the illuminance may be effected by controlling the luminous intensity of the light source used. If desired, exposure may be effected by the use of various filters, or the distance between the photographic material and the light source and the angle of the light source to the photographic material may appropriately be varied. The illuminance of the fogging light may continuously be varied from a low illuminance to a high illuminance, or it may be stepwise increased.

Preferably, light-irradiation to the photographic material for light-fogging is effected after the material has been dipped in a developer or a pre-bath thereof and the developer or the pre-bath liquid has been sufficiently infiltrated into the material. The time between infiltration of the developer or liquid into the material and light-fogging of the material is generally from 2 seconds to 2 minutes, preferably from 5 seconds to 1 minute, more preferably from 10 seconds to 30 seconds.

The exposure time for fogging is generally from 0.01 second to 2 minutes, preferably from 0.1 second to 1 minute, more preferably from 1 second to 40 seconds.

Where the photographic material of the invention is fogged by "chemical-fogging", a nucleating agent may be incorporated into the photographic material or into the processing solution to be used for processing the material. Preferably, it is incorporated into the photographic material.

The "nucleating agent" as referred to herein is a substance for acting on the previously non-fogged internal latent image-type silver halide emulsion during surface development of the emulsion to thereby form a direct positive image. In accordance with the present invention, the photographic material is preferably fogged in the presence of a nucleating agent.

Where the nucleating agent is incorporated into the photographic material, it is preferably added to the internal latent image-type silver halide emulsion layer for constituting the material. However, it may be added for any other layer, such as an interlayer, a subbing layer or a backing layer, so far as the nucleating agent may diffuse and adsorb to the silver halide grains in the emulsion layer during coating or during processing.

Where the nucleating agent is added to the processing solution, it may be incorporated into the developer or into the pre-bath thereof having a lower pH value, as so described in JP-A-58-178350.

Two or more different kinds of nucleating agents may be used in combination, as the case may be.

As the nucleating agent for use in the present invention, compounds of the following formulae (N-I) to (N-II) are preferred. Especially preferred are compounds of formula (N-I).

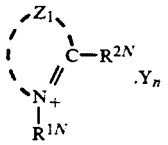

(N-I)

In formula (N-I), $Z_1$ represents a non-metallic atomic group necessary for forming a 5-membered or 6-membered heterocyclic group; $R^{1N}$ represents an aliphatic group; and $R^{2N}$ represents a hydrogen atom, an aliphatic group or an aromatic group; $Z_1$ and $R^{1N}$ and $R^{2N}$ may optionally be substituted; and $R^{2N}$ may be bonded to the hetero ring formed by $Z_1$ to from a ring. However, at least one of $R^{1N}$, $R^{2N}$ and $Z_1$ must contain an alkynyl group, an acyl group, a hydrazine group or a hydrazone group; or $R^{1N}$ and $R^{2N}$ form a 6-membered ring comprising dihydropyridinium skeleton. Y represents a pair ion for charge balance of the molecule; and n represents 0 or 1.

More precisely, the hetero ring completed by $Z_1$ includes, for example, quinoxalinium, benzothiazolium, benzimidazolium, pyridinium, thiazolinium, thiazolium, naphthothiazolium, selenazolium, benzoselenazolium imidazolium, tetrazolium, indolenium, pyrrolinium, acridinium, phenanthridinium, isoquinolinium, oxazolium, naphthoxazolium and benzoxazolium nuclei. Examples of substituents which may be in the group $Z_1$, are a $C_{1-8}$ alkyl group, a $C_{2-10}$ alkenyl group, a $C_{7-16}$ aralkyl group, a $C_{6-15}$ aryl group, a $C_{2-10}$ alkynyl group, a hydroxyl group, a $C_{1-8}$ alkoxy group, a $C_{6-15}$ aryloxy group, a halogen atom, a $C_{0-16}$ amino group, a $C_{1-8}$ alkylthio group, a $C_{6-15}$ arylthio group, a $C_{1-9}$ acyloxy group, an $C_{1-9}$ acylamino group, a $C_{1-8}$ sulfonyl group, a $C_{1-8}$ sulfonyloxy group, a $C_{0-8}$ sulfonylamino group, a carboxyl group, a $C_{1-9}$ acyl group, a $C_{1-8}$ carbamoyl group, a $C_{0-8}$ sulfamoyl group, a sulfo group, a cyano group, a $C_{1-10}$ ureido group, a $C_{1-10}$ urethane group, a $C_{1-11}$ carbonate group, a $C_{0-10}$ hydrazine group, a $C_{0-10}$ hydrazone group and a $C_{0-10}$ imino group. Suitable substituent(s) present in the group Z include at least one selected from the above-mentioned substituents. Where the group Z has two or more substituents, the substituents may be the same or different. Additionally, the above-mentioned substituents may further be substituted by any of the above substituents.

Further, another example of the substituent present in the group $Z_1$ include a heterocyclic quaternay ammonium group completed by $Z_1$ via a appropriate linking group L. In this case, the compound is said to have a so-called dimer structure.

Examples of heterocyclic groups completed by the group $Z_1$ are preferably quinolinium, benzothiazolium, be nzimidazolium, pyridinium, acridinium, phenanthridinium and isoquinolinium nuclei. More preferred are quinolinium and benzothiazolium nuclei; and most preferred is a quinolinium nucleus.

The aliphatic group represented by $R^{1N}$ or $R^{2N}$ is preferably an unsubstituted alkyl group having from 1 to 18 carbon atoms, or a substituted alkyl group in which the alkyl moiety has from 1 to 18 carbon atoms. Examples of substituents present in the substituted alkyl group include the same substituents as described above for $Z_1$. Additionally, $R^{2N}$ may be bonded to the hetero ring completed by $Z_1$ to form a ring.

The aromatic group represented by $R^{2N}$ is preferably one having from 6 to 20 carbon atoms, which includes, for example, a phenyl group and a naphthyl group. Examples of substituents in the aromatic group include the substituents for the group $Z_1$ described above. Preferably, $R^{2N}$ is an aliphatic group; and most preferably, it is a methyl group, a substituted methyl group, or a group bonded to the hetero ring completed by the group $Z_1$ to form a ring.

At least one of the groups $R^{1N}$, $R^{2N}$ and Z has an alkynyl group, an acyl group, a hydrazine group or a hydrazone group; or $R^{1N}$ and $R^{2N}$ form a 6-membered ring to complete a dihydropyridinium skeleton. These may optionally be substituted by substituents, for example, those as described above as substituents of the group $Z_1$.

In accordance with the present invention, preferred is the case where at least one of $R^{1N}$, $R^{2N}$ and $Z_1$ or at least one the substituents on the 6-membered ring formed by $R^{1N}$ and $R^{2N}$ is an alkynyl group or an acyl group, or the case where $R^{1N}$ and $R^{2N}$ are bonded to form a dihydropyridinium skeleton. More preferably, the compound contains at least one alkynyl group, most preferably at least one propargyl group.

A group of the formula $X^1—(L^1)_m—$ is preferred, in which $X^1$ represents a silver halide adsorption-accelerating group, $L^1$ represents a divalent linking group, and m represents 0 or 1 as the silver halide adsorption-accelerating group which may be in the substituents of $R^{1N}$, $R^{2N}$ and $Z_1$.

Preferred examples of silver halide adsorption-accelerating groups represented by $X^1$ include a thioamido group, a mercapto group and a 5-membered or 6-membered heterocyclic group.

These groups may optionally be substituted by substituents, for example, those as described with respect to the substituents of the group $Z_1$. The thioamido group is preferably a non-cyclic thioamido group (for example, a thiourethane group or a thioureido group).

A heterocyclic mercapto group is especially preferred as the mercapto group represented by $X^1$ with examples, including 5-mercaptotetrazole, 3-mercapto-1,2,4-triazole, 2-mercapto-1,3,4-thiadiazole, and 2-mercapto-1,3,4-oxadiazole.

The 5-membered or 6-membered nitrogen-containing heterocyclic group as represented by $X^1$ is composed of nitrogen, oxygen, sulfur and carbon atoms. Preferably, it is to form an imino silver, for example, including a benzotriazole and an aminothiatriazole.

The divalent linking group as represented by $L^1$ is an atom or an atomic group containing at least one of C, N, S and O atoms. Specifically, examples include a $C_{1-10}$ alkylene group, a $C_{1-10}$ alkenylene group, a $C_{2-10}$ alkynylene group, a $C_{6-15}$ arylene group, —O—, —S—, —NH—, —N=, —CO— and $-SO_2-$, as well as a combination of two or more of these groups. The groups may optionally be substituted. Examples of preferred combinations of these groups are $$-\overset{O}{\overset{\|}{C}}-,\quad -\overset{O}{\overset{\|}{C}}NH-,\quad -SO_2NH-,$$

$$-O\overset{O}{\overset{\|}{C}}NH-,\quad -NH\overset{O}{\overset{\|}{C}}NH-,\quad -NHSO_2NH-,$$

$$-(\text{alkylene})-\overset{O}{\overset{\|}{C}}NH-,\quad -(\text{arylene})-SO_2NH-,$$

$$-(\text{arylene})-NH\overset{O}{\overset{\|}{C}}NH- \text{ and } -(\text{arylene})-\overset{O}{\overset{\|}{C}}NH-.$$

Examples of the pair ion Y for charge balance are, for example, bromide ion, chloride ion, iodide ion, p-toluenesulfonate ion, ethylsulfonate ion, perchlorate ion, trifluoromethanesulfonate ion, thiocyan ion, boron tetrafluoride ion and phosphorus hexafluoride ion.

These compounds and methods of their prepariation are described, for example, in patent publications referred to in *Research Disclosure*, No. 22543 (issued on January, 1983, pages 50 to 54) and No. 23213 (issued on August, 1983, pages 267 to 270), as well as in JP-B-49-38164, JP-B-52-19452 and JP-B-52-47326, JP-A-52-69613, JP-A-52-3426, JP-A-55-138742 and JP-A-60-11827, and U.S. Pat. Nos. 4,306,016 and 4,471,044.

$$R^{3N}-\underset{\underset{R^{5N}}{|}}{N}-\underset{\underset{R^{6N}}{|}}{N}-G-R^{4N} \qquad \text{(N-II)}$$

In formula (N-II), $R^{3N}$ represents an aliphatic group, an aromatic group, or a heterocyclic group; $R^{4N}$ represents a hydrogen atom, an alkyl group, an aralkyl group, an aryl group, an alkoxy group, an aryloxy group or an amino group; G represents a carbonyl group, a sulfonyl group, a sulfoxy group, a phosphoryl group or an iminomethylene group (HN=C=); and both $R^{5N}$ and $R^{6N}$ are hydrogen atoms, or one of them represents a hydrogen atom and the other represents an alkylsulfonyl group, an arylsulfonyl group or an acyl group. G, $R^{4N}$ and $R^{6N}$ may form, together with the hydrazine nitrogen atoms, a hydrazone structure (=N—N=C=). The above-mentioned groups may optionally be substituted by substituent(s), if possible.

More particularly, $R^{3N}$ may be substituted by a substituent, which in turn may be further substituted, such as an alkyl group, an aralkyl group, an alkoxy group, an amino group substituted by an alkyl or aryl group, an acylamino group, a sulfonylamino group, a ureido group, a urethane group, an aryloxy group, a sulfamoyl group, a carbamoyl group, an aryl group, an alkylthio group, an arylthio group, a sulfonyl group, a sulfinyl group, a hydroxy group, a halogen atom, a cyano group, a sulfo group and a carboxyl group, with a ureido group or sulfonamido group preferred, which groups may link together to form a ring, if possible.

Preferably, $R^{3N}$ represents an aromatic group, an aromatic heterocyclic ring group or an aryl-substituted methyl group, with an aryl group (e.g., a phenyl group and a naphthyl group) more preferred.

Preferably, $R^{4N}$ represents a hydrogen atom, an alkyl group (e.g., a methyl group) or an aralkyl group (e.g., an o-hydroxybenzyl group), with a hydrogen atom particularly preferred.

The substituents for $R^{4N}$ include those for $R^{3N}$ as well as an acyl group, an acyloxy group, an alkyloxycarbonyl group, an aryloxycarbonyl group, an alkenyl group, an alkynyl group and a nitro group, which may be further substituted any of those substituents, and, if possible, may link together to form a ring.

$R^{3N}$ or $R^{4N}$, in particular $R^{3N}$, may contain a diffusion-resistant group such as a coupler, ballast group (preferably linked through a ureido group) and may contain a group $X^2$-($L^2$)-$m^2$ capable of accelerating adsorption onto the surface of silver halide grains, where $X^2$ has the same meaning as $X^1$ in general formula (N-I) and preferably represents a thioamide group (excluding a thiosemicarbazide and its substitution product), a mercapto group or a 5- or 6- membered nitrogen-containing heterocyclic ring group, $L^2$ represents a divalent liking group and has the same meaning as $L^1$ in general formula (N-I), and $m^2$ is 0 or 1.

Preferably, X2 represents a non-cyclic thioamido group (e.g., a thioureido group and a thiourethane group), a cyclic thioamido group (i.e., a mercapto-substituted nitrogen-containing heterocyclic ring, e.g., a 2-mercaptothiadiazole group, a 3-mercapto-1,2,4-triazole group, a 5-mercaptotetrazole group, a 2-mercapto-1,3,4-oxadiazole group and a 2-mercaptobenzoxazole group)or a nitrogen-containing heterocyclic ring group (e.g., a benzotriazole group, benzimidazole group and an indazole group).

Most preferably, $X^2$ is determined based on the photosensitive material. For example, in the case of a color photosensitive material that uses a coloring material (a so-called coupler) that forms a dye when coupled with the oxidation product of a p-phenylenediamine type developing agent, $X^2$ preferably represents a mercapto-substituted nitrogen-containing heterocyclic ring or a nitrogen-containing heterocyclic ring that will form an imino silver. In the case of a color photosensitive material that uses a coloring material (a so-called DRR compound) that forms a diffudion-resistant dye by cross-oxidizing the oxidation product of a developing agent, $X^2$ preferably represents a non-cyclic thiamido group or a mercapto-substituted nitrogen-containing heterocyclic ring. In the case of a black-and-white photosensitive material, $X^2$ preferably represents a mercapto-substituted nitrogen-containing heterocyclic ring or a nitrogen-containing heterocyclic ring that will form an imino silver.

Most preferably, $R^{5N}$ and $R^{6N}$ represent a hydrogen atom.

Most preferably, G in general formula (N-II) represents a carbonyl group.

Preferably, the compound represents by general formula (N-II) contains a group capable of being absorbed onto a silver halide or a group having a ureido group.

Particularly, examples of hydrazine type nucleating agents having a group capable of being absorbed onto a silver halide, and synthetic methods therefor and described, for example, in U.S. Pat. Nos. 4,030,925, 4,080,207, 4,031,127, 3,718,470, 4,269,929, 4,276,364, 4,278,748, 4,385,108, 4,459,928, and 4,560,638, British Patent 2,011,391B and JP-A-54-74729, JP-A-55-163533, JP-A-55-74536, and JP-A-60-179734.

Examples of other hydrazine type nucleating agents and synthetic methods therfor are described, for example, in JP-A-57-86829, U.S. Pat. Nos. 4,560,638, 4,478,528, 2,563,785 and 2,588,982.

Specific examples of compounds of the formulae (N-I) and (N-II) are described below, which, however, do not whatsoever restrict the scope of the present invention.

(N-1-1)

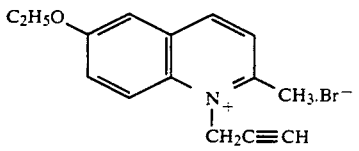

(N-1-2)

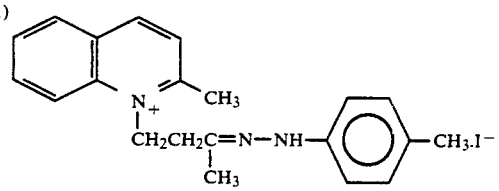

(N-1-3)

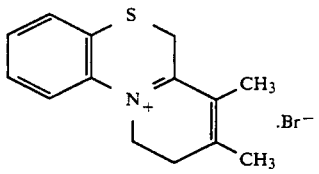

(N-1-4)

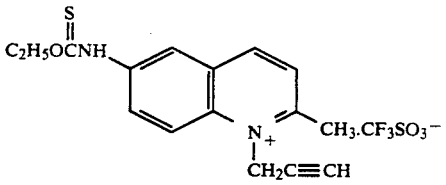

(N-1-5)

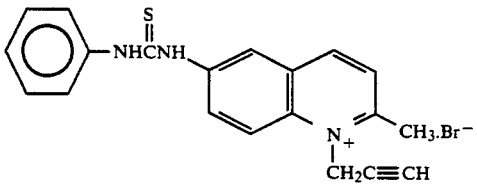

(N-1-6)

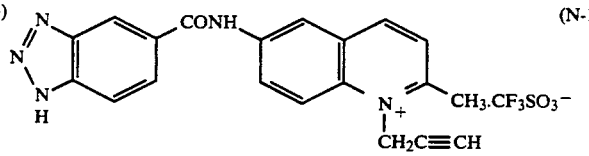

(N-1-7)

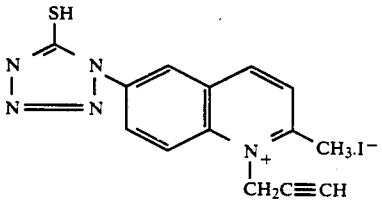

(N-1-8)

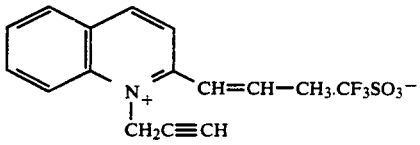

-continued
(N-1-9)
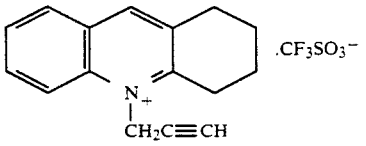
(N-1-10)
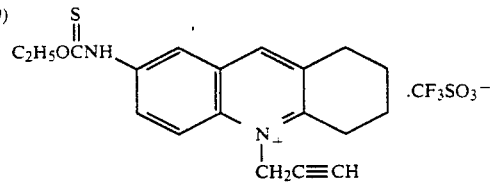
(N-1-11)
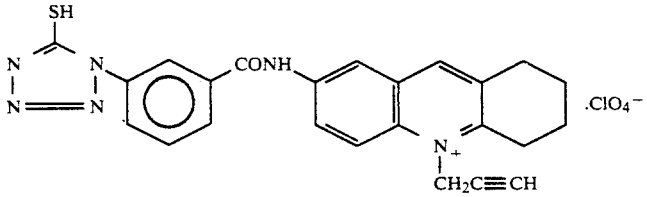
(N-1-12)
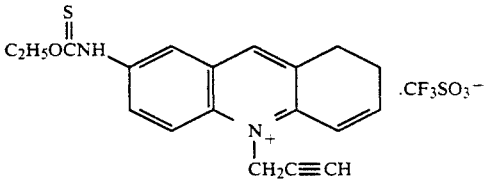
(N-1-13)
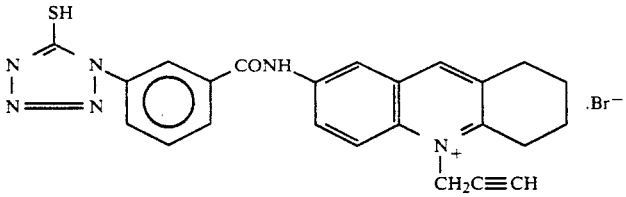
(N-1-14)
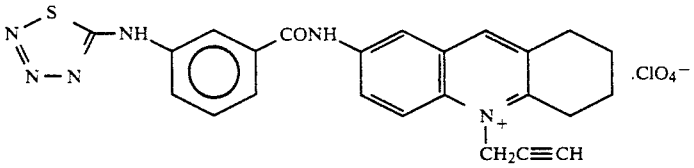
(N-1-15)
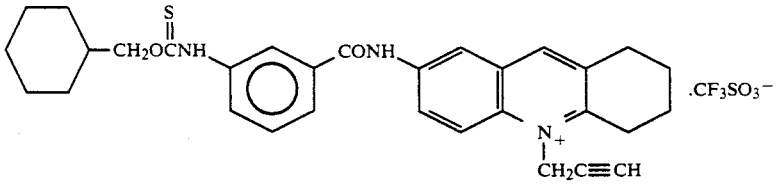
(N-1-16)
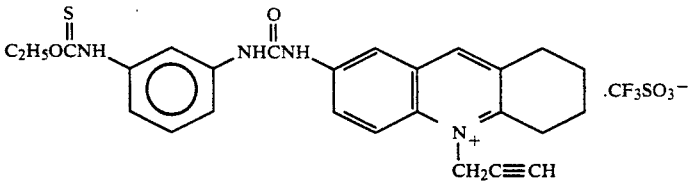
(N-1-17)
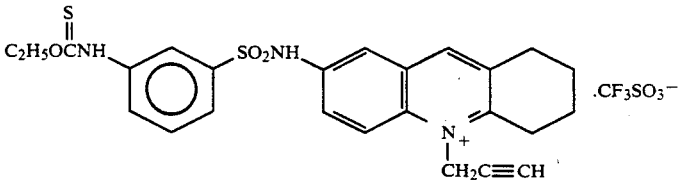

-continued
(N-1-18)
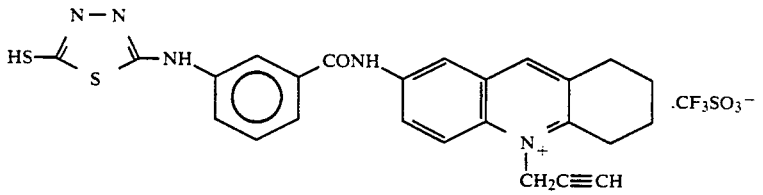
(N-1-19)
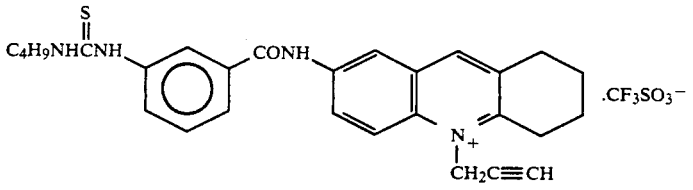
(N-I-20)
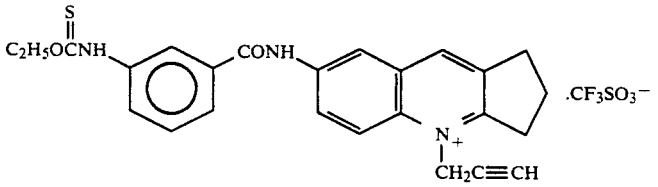
(N-II-1)
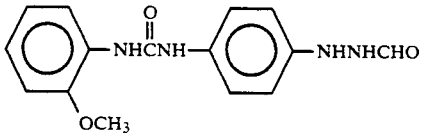
(N-II-2)
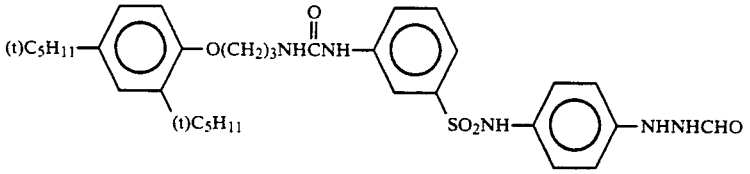
(N-II-3)
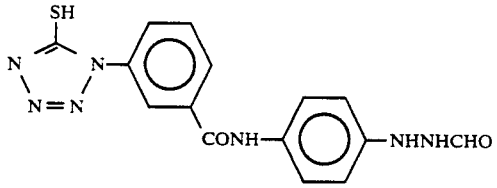
(N-II-4)
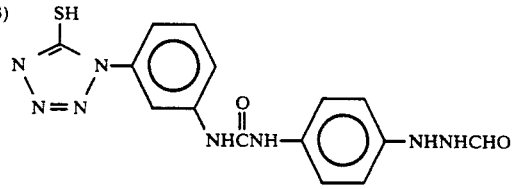
(N-II-5)
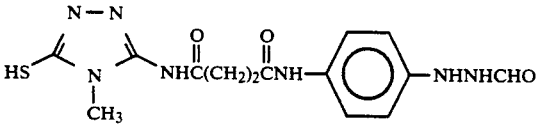
(N-II-6)
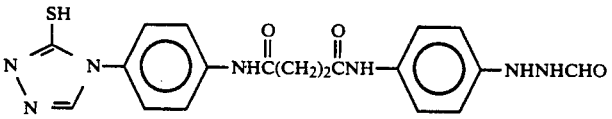
(N-II-7)
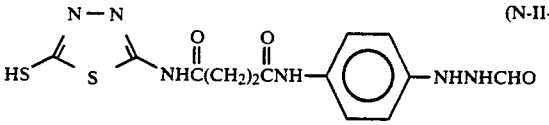
(N-II-8)
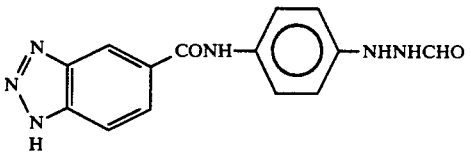

-continued
(N-II-9)
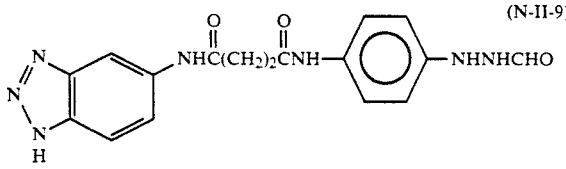
(N-II-10)
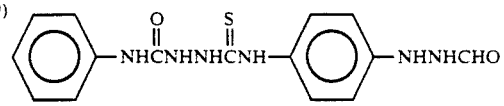
(N-II-11)
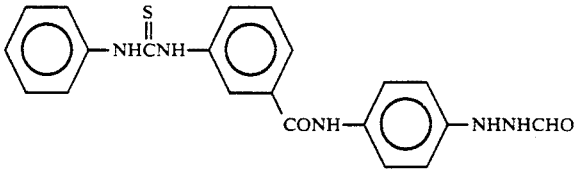
(N-II-12)
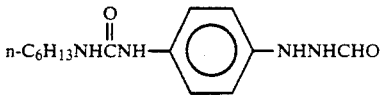
(N-II-13)
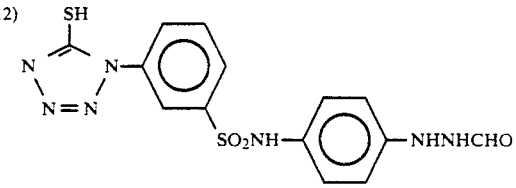
(N-II-14)
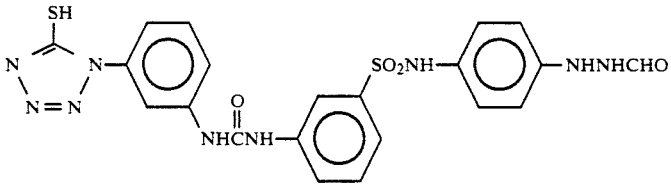
(N-II-15)
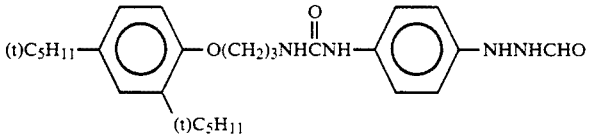
(N-II-16)
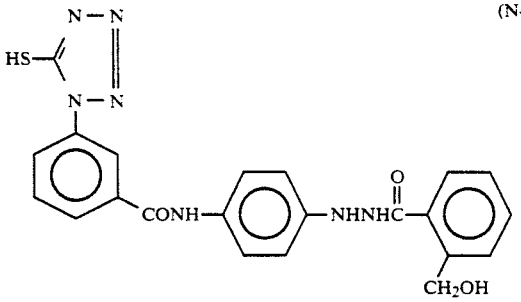
(N-II-17)
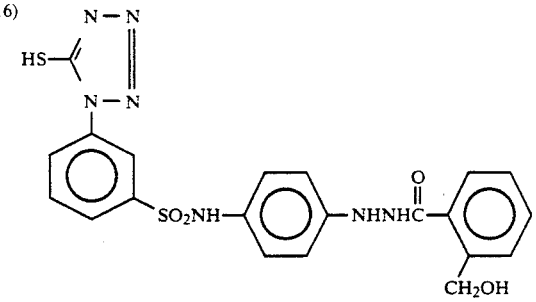
(N-II-18)
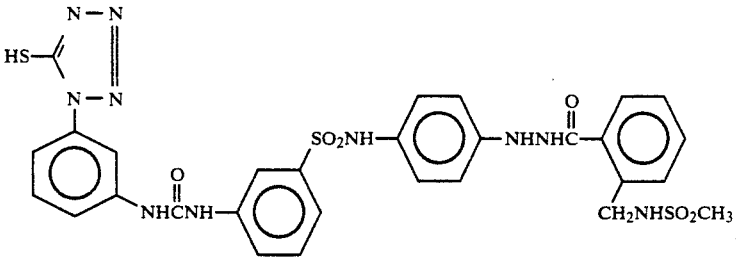
(N-II-19)
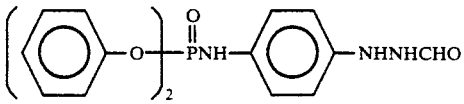
The nucleating agent may be incorporated into the photographic material or into the processing solution to Where the nucleating agent is incorporated into the photographic material, it is preferably added to the internal latent image-type silver halide emulsion layer of the material. However, it may also be added to any other layer, such as an interlayer, a subbing layer or a backing layer, so far as the nucleating agent may diffuse and adsorb to the silver halide grains in the emulsion layer during coating or during processing. Where the nucleating agent is added to the processing solution, it may be incorporated into the developer or into the pre-bath thereof having a lower pH value, as so described in JP-A- 58-178350.

Where the nucleating agent is incorporated into the photographic material, the amount of the agent is preferably from $10^{-8}$ to $10^{-2}$ mol, more preferably from $10^{-7}$ to $10^{-3}$ mol, per mol of silver halide.

Where the nucleating agent is added to the processing solution, the amount of the agent is preferably from $10^{-5}$ to $10^{-1}$ mol/liter, more preferably from $10^{-4}$ to $10^{-2}$ mol/liter.

In the present invention, a nucleation accelerator, such as those set forth below, may be used for the purpose of accelerating the effect of the above-mentioned nucleating agent.

As the nucleation accelerator to be used for this purpose, examples include tetrazaindenes, triazaindenes and pentazaindenes having at least one mercpato group which may optionally be substituted by an alkali metal atom or an ammonium group, as well as compounds described in JP-A-63-106656, pages 6 to 16.

Specific examples of usable nucleation accelerators are set forth below, which, however, are not limitative.

(A-1): 3-Mercapto-1,2,4-triazolo[4,5-a]pyridine
(A-2): 3-Mercapto-1,2,4-triazolo[4,5-a]pyrimidine
(A-3): 5-Mercapto-1,2,4-triazolo[1,5-a]pyrimidine
(A-4): 7-(2-Dimethylaminoethyl)-5-mercapto-1,2,4-triazolo-[1,5-a]pyrimidine
(A-5): 3-Mercapto-7-methyl-1,2,4-triazolo[4,5-a]-pyrimidine
(A-6): 3,6-Dimercapto-1,2,4-triazolo[4,5-b]pyridazine
(A-7): 2-Mercapto-5-methylthio-1,3,4-thiadiazole
(A-8): 3-Mercapto-4-methyl-1,2,4-triazole
(A-9): 2-(3-Dimethylaminopropylthio)-5-mercapto-1,3,4-thiadiazole hydrochloride
(A-10): 2-(2-Morpholinoethylthio)-5-mercapto-1,3,4-thiadizole hydrochloride The nucleation accelerator may be incorporated into the photographic material or into the processing solution to be used for processing the material. Preferably, it is incorporated into the photographic material, especially into the internal latent image-type silver halide emulsion layer and other hydrophilic colloid layers (e.g., interlayer, protective layer) of the material. Most preferably, the nucleation accelerator is incorporated into the silver halide emulsion layer or the adjacent layers thereof.

The amount of the nucleation accelarator is $10^{-6}$ to $10^{-3}$ mol per mol of silver halide.

For development of the photographic material of the present invention, a color developer is used, which is preferably an alkaline aqueous solution containing an aromatic primary amine color developing agent. As the color developing agent, p-phenylenediamine compounds are preferably used, though aminophenol compounds may also be used. Specific examples of the preferred compounds include 3-methyl-4-amino-N,N-diethylaniline, 3-methyl-4-amino-N-ethyl-N-β-hydroxyethylaniline, 3-methyl-4-amino-N-β-methanesulfonamidoethylaniline, 3-methyl-4-amino-N-ethyl-N-β-methoxyethylaniline, and sulfates, hydrochlorides and p-toluenesulfonates thereof. Two or more of these compounds may be used in combination.

The color developer to be used for processing the photographic material of the present invention has a pH value of from 9 to 12, preferably from 9.5 to 11.5.

After color-developed, the photographic material of the invention is generally bleached. Bleaching of the material may be effected simultaneously with fixation thereof (as bleach-fixation) or may be effected separately therefrom. Further, in order to accelerate the processing, bleaching may be followed by bleach-fixation. As the case may be, continuous bleach-fixation may be effected by the use of a two-bath bleach-fixation system; or fixation may be effected prior to bleach-fixation; or bleach-fixation may be followed by bleaching. The processes may freely be selected in accordance with the objectives of present invention.

The silver halide color photographic material of the present invention is generally rinsed and/or stabilized, after it has been desilvered. The amount of the rinsing water to be used in the rinsing step may be broadly defined in accordance with the characteristics of the photographic material to be processed (for example, coupler and other raw materials of constituting the photographic material), the use of the material, the temperature of the rinsing water, the number of the rinsing tanks (the number of the rinsing stages), the replenishment system of normal current or counter-current, and other various conditions. Among them, the relation between the number of the rinsing tanks and the amount of the rinsing water in a multi-stage counter-current system may be obtained on the basis of the method described in *Journal of the Society of Motion Picture and Television Engineers,* Vol 64, pages 248 to 253 (May 1955 issue).

The silver halide color photographic material of the present invention can contain a color developing agent for the purpose of simplifying and promoting the processing of the material. In this case, various precursors of color developing agents are preferably used for incorporating the agent to the material.

On the other hand, where the photographic material of the invention is a black-and-white photographic material, various known developing agents may be used for developing the material. For instance, usable agents include polyhydroxybenzenes such as hydroquinone, 2-chlorohydroquinone, 2-methylhydroquinone, catechol or pyrogallol; aminophenol such as p-aminophenol, N-methyl-p-aminophenol or 2,4-diaminophenol; 3-pyrazolidones such as 1-phenyl-3-pyrazolidones, 1-phenyl-4,4'-dimethyl-3-pyrazolidone, 1-phenyl-4-methyl-4-hydroxymethyl-3-pyrazolidone or 5,5-dimethyl-1-phenyl-3-pyrazolidone; and ascorbic acids. These compounds may be used alone or in combination with two or more of them. Additionally, the developers described in JP-A-58-55928 may also be used.

The present invention will be explained in more detail by way of the following examples, which, however, are not intended to restrict the scope of the present invention.

EXAMPLE 1

Preparation of Em-1

An aqueous solution of potassium bromide and an aqueous solution of silver nitrate were simultaneously added to an aqueous solution of gelatin while vigorously stirring at 50° C., over a period of 8 minutes, to obtain octahedral silver bromide grains having a mean grain size of 0.18 micron, whereupon 3,4-dimethyl-1,3-thiazoline-2-thione was added thereto in an amount of 0.1 g per mol of silver. Then, the resulting emulsion was chemically sensitized by adding 5 mg per mol of silver of sodium thiosulfate and 7 mg per mol of silver of chloroauric acid (tetrahydrate) thereto in order followed by heating at 75° C. for 80 minutes. The thus formed core grains were grown further under the same precipitation conditions as that for the first time. Accordingly, a monodispersed octahedral core/shell silver bromide emulsion having a mean grain size of 0.25 micron was finally obtained. The fluctuation coefficient of the grain size was about 10%. 1.5 mg per mol of silver of sodium thiosulfate and 1.5 mg per mol of silver of chloroauric acid (tetrahydrate) were added to the emulsion and heated at 60° C. for 60 minutes, whereby the emulsion was chemically sensitized to give an internal latent image-type silver halide emulsion.

Preparation of Direct Positive Photographic Material Samples

Both surfaces of a paper support (thickness: 100 microns) were laminated with polyethylene. The following first to fourteenth layers were formed on the surface of the support and the following fifteenth and sixteenth layers were on the back surface thereof to prepare a photographic material sample. The laminated polyethylene below the first layer contained 4 g/m$^2$ of titanium oxide as a white pigment and 0.003 g/m$^2$ of ultramarine as a bluish dye. The chromaticity of the surface of the support was 88.0, −0.20, −0.75 as L*, a*,b* system.

Compositions of Coated Layers

The components coated and the amounts thereof are set forth below, as a unit of g/m$^2$. The amount of silver halide coated is represented by the amount of silver therein. Emulsions in the photographic layers were prepared in accordance with the method of preparing Emulsion (Em-1). However, the emulsion in the fourteenth layer was a Lippmann emulsion, the surface of which was not chemically sensitized.

| | |
|---|---|
| First Layer: Anti-Halation Layer | |
| Black Colloidal Silver | 0.10 |
| Gelatin | 0.35 |
| Second Layer: Interlayer | |
| Gelatin | 0.40 |
| Third Layer: Low-Sensitivity Red-Sensitive Layer | |
| Silver Bromide as color-sensitized with Red-sensitizing Dyes (ExS-1, 2, 3) (mean grain size 0.25 micron; size distribution of fluctuation coefficient 8%; octahedral grains) | 0.12 |
| Gelatin | 0.80 |
| Cyan Coupler (ExC-1/ExC-2 of 1/1) | 0.30 |
| Anti-Fading Agent (Cpd-1/Cpd-2/ Cpd-3/Cpd-4 of 1/1/1/1) | 0.18 |
| Stain Inhibitor (Cpd-5) | 0.003 |
| Coupler Dispersion Medium (Cpd-6) | 0.03 |
| Coupler Solvent (Solv-1/Solv-2/ Solv-3 of 1/1/1) | 0.12 |
| Fourth Layer: High-Sensitivity Red-Sensitive Layer | |
| Silver Bromide as color-sensitized with Red-Sensitizing Dyes (ExS-1, 2, 3) (mean grain size 0.60 micron; size distribution 15%; octahedral grains) | 0.14 |

-continued

| | |
|---|---|
| Gelatin | 0.80 |
| Cyan Coupler (ExC-1/ExC-2 of 1/1) | 0.30 |
| Anti-Fading Agent (Cpd-1/Cpd-2/ Cpd-3/Cpd-4 of 1/1/1/1) | 0.18 |
| Coupler Dispersion Medium (Cpd-6) | 0.03 |
| Coupler Solvent (Solv-1/Solv-2/ Solv-3 of 1/1/1) | 0.12 |
| Fifth Layer: Interlayer | |
| Gelatin | 0.70 |
| Color Mixing Preventing Agent (Cpd-7) | 0.08 |
| Color Mixing Preventing Agent Solvent (Solv-4/Solv-5 of 1/1) | 0.16 |
| Polymer Latex (Cpd-8) | 0.10 |
| Sixth Layer: Low-sensitivity Green-Sensitive Layer | |
| Silver Bromide as color-sensitized with Green-Sensitizing Dye (ExS-4) (mean grain size 0.25 micron; size distribution 8%; octahedral grains) | 0.10 |
| Gelatin | 0.70 |
| Magenta Coupler (ExM-1/ExM-2/ ExM-3 of 1/1/1) | 0.11 |
| Anti-Fading Agent (Cpd-9/Cpd-26 of 1/1) | 0.15 |
| Stain Inhibitor (Cpd-10/Cpd-11/ Cpd-12/Cpd-13 of 10/7/7/1) | 0.025 |
| Coupler Dispersion Medium (Cpd-6) | 0.05 |
| Coupler Solvent (Solv-4/Solv-6 of 1/1) | 0.15 |
| Seventh Layer: High-Sensitivity Green-Sensitive Layer | |
| Silver Bromide as color-sensitized with Green-Sensitizing Dye (ExS-4) (mean grain size 0.65 micron; size distribution 16%; octahedral grains) | 0.10 |
| Gelatin | 0.70 |
| Magenta Coupler (ExM-1/ExM-2/ExM-3 of 1/1/1) | 0.11 |
| Anti-Fading Agent (Cpd-9/Cpd-26 of 1/1) | 0.15 |
| Stain Inhibitor (Cpd-10/Cpd-11/ Cpd-12/Cpd-13 of 10/7/7/1) | 0.025 |
| Coupler Dispersion Medium (Cpd-6) | 0.05 |
| Coupler Solvent (Solv-4/Solv-6 of 1/1) | 0.15 |
| Eighth Layer: Interlayer | |
| Same as fifth layer | |
| Ninth Layer: Yellow Filter Layer | |
| Yellow Colloidal Silver (grain size 100 Å) | 0.12 |
| Gelatin | 0.60 |
| Color Mixing Preventing Agent (Cpd-7) | 0.03 |
| Color Mixing Preventing Agent Solvent (Solv-4/Solv-5 of 1/1) | 0.10 |
| Polymer Latex (Cpd-8) | 0.07 |
| Tenth Layer: Interlayer | |
| Same as fifth layer | |
| Eleventh Layer: Low-Sensitivity Blue-Sensitive Layer | |
| Silver Bromide as color-sensitized with Blue-Sensitizing Dyes (ExS-5, 6) (mean grain size 0.40 micron; size distribution 8%; octahedral grains) | 0.21 |
| Gelatin | 0.70 |
| Yellow Coupler (ExY-1/ExY-2 of 1/1) | 0.35 |
| Anti-Fading Agent (Cpd-14) | 0.10 |
| Stain Inhibitor (Cpd-5/Cpd-15 of 1/5) | 0.007 |
| Coupler Dispersion Medium (Cpd-6) | 0.05 |
| Coupler Solvent (Solv-2) | 0.10 |
| Twelfth Layer: High-Sensitivity Blue-Sensitive Layer | |
| Silver Bromide as color-sensitized with Blue-Sensitizing Dyes (ExS-5, 6) (mean grain size 0.85 micron; size distribution 18%; octahedral grains) | 0.15 |
| Gelatin | 0.55 |
| Yellow Coupler (ExY-1/ExY-2 of 1/1) | 0.30 |
| Anti-Fading Agent (Cpd-14) | 0.10 |
| Stain Inhibitor (Cpd-5/Cpd-15 of 1/5) | 0.007 |
| Coupler Dispersion Medium (Cpd-6) | 0.05 |
| Coupler Solvent (Solv-2) | 0.10 |

-continued

| | |
|---|---|
| Thirteenth Layer: Ultraviolet Absorbing Layer | |
| Gelatin | 0.80 |
| Ultraviolet Absorbent (Cpd-2/Cpd-4/ Cpd-16 of 1/1/1) | 0.50 |
| Color Mixing Preventing Agent (Cpd-7/ Cpd-17 of 1/1) | 0.03 |
| Dispersion Medium (Cpd-6) | 0.02 |
| Ultraviolet Absorbent Solvent (Solv-2/Solv-7 of 1/1) | 0.08 |
| Anti-Irradiation Dye (Cpd-18/Cpd-19/ Cpd-20/Cpd-21/Cpd-27 of 10/10/13/15/20) | 0.05 |
| Fourteenth Layer: Protective Layer | |
| Fine Silver Chlorobromide Grains (silver chloride: 97 mol %, mean grain size 0.1 micron) | 0.03 |
| Acryl-Modified Copolymer of Polyvinyl Alcohol (mean molecular weight 50,000) | 0.01 |
| Mixture (1/1) of Polymethyl Methacrylate Grains (mean grain size 2.4 microns) and Silicon Oxide (mean grain size 5 microns) | 0.05 |
| Gelatin | 1.50 |
| Gelatin Hardening Agent (H-1/H-2 of 1/1) | 0.18 |
| Fifteenth Layer: Backing Layer | |
| Gelatin | 2.25 |
| Ultraviolet Absorbent (Cpd-2/Cpd-4/ Cpd-16 of 1/1/1) | 0.50 |
| Dye (Cpd-18/Cpd-19/Cpd-20/Cpd-21/ Cpd-27 of 1/1/1/1/1) | 0.06 |
| Sixteenth Layer: Back Surface-Protecting Layer | |
| Mixture (1/1) of Polymethyl Methacrylate Grains (mean grain size 2.4 microns) and Silicon Oxide (mean grain size 5 microns) | 0.05 |
| Gelatin | 1.75 |
| Gelatin Hardening Agent (H-1/H-2 of 1/1) | 0.14 |

The light-sensitive layers contained $10^{-3}$% by weight to silver halide of ExZK-1 as a nucleating agent and $10^{-2}$% by weight to silver halide of Cpd-22 as a nucleation accelerator. Further, the layers contained Alkanol XC (by E. I. Du Pont de Nemours & Co.) and sodium alkylbenzenesulfonate as an emulsion-dispersion aid and succinate and Magefac F-120 (by Dainippon Ink & Chemicals, Inc.) as a coating aid. The silver halide-containing layers and the colloidal silver-containing layers contained a mixture of Cpd-23, Cpd-24 and Cpd-25 as a stabilizer.

The photographic material sample thus prepared was Sample No. 1. Other Samples Nos. 2 to 10 were prepared in the same manner as in the preparation of Sample No. 1, except that a compound of formula (I) was added to the 3rd, 4th, 6th, 7th, 11th and 12th layers as indicated in Table 1 below, each in an amount of $1\times10^{-5}$ mol/m$^2$. The total amount of the compound as added to each sample was $6\times10^{-5}$ mol/m$^2$.

Compounds used for preparing the samples are set forth below.

ExS-1

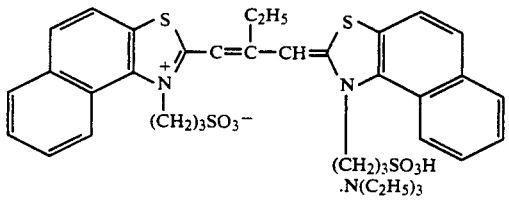

ExS-2

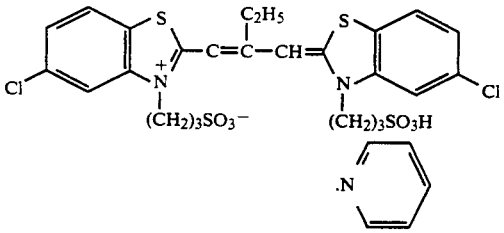

ExS-3

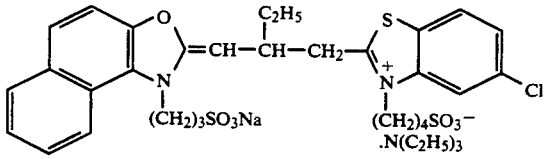

ExS-4

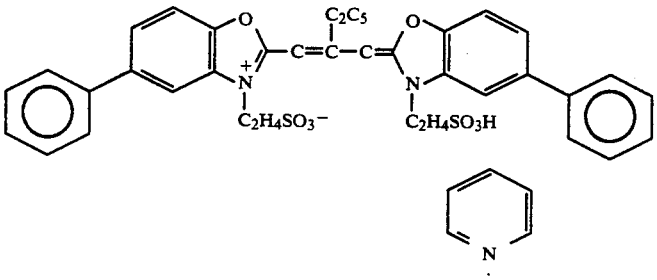

-continued
ExS-5
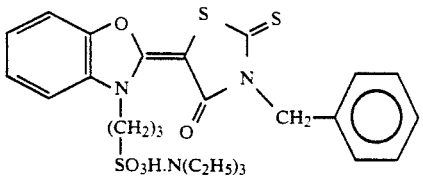
ExS-6
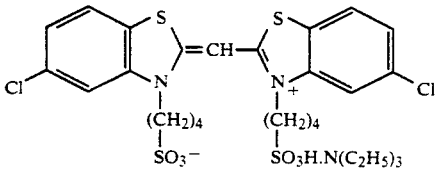
Cpd-1
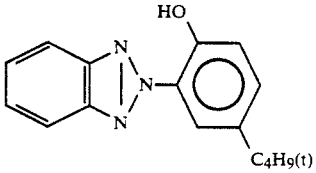
Cpd-2
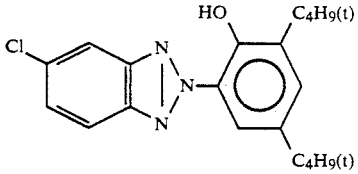
Cpd-3
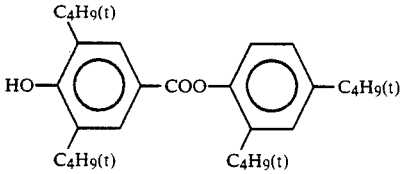
Cpd-4
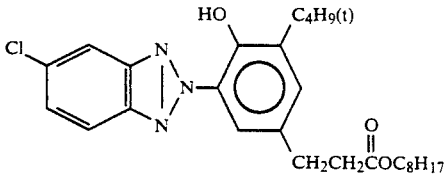
Cpd-5
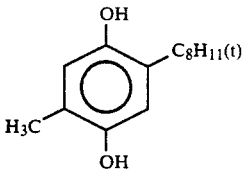
Cpd-6
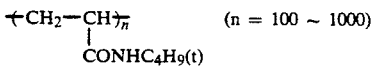
Cpd-7
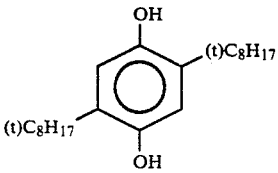
Cpd-8
Polyethyl Acrylate
(MW = 10,000 ~ 100,000)

-continued
Cpd-9
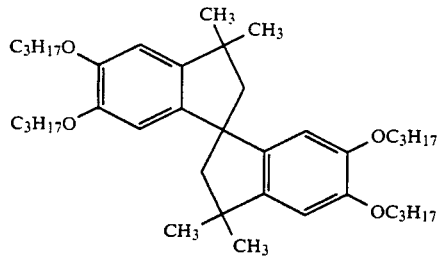
Cpd-10
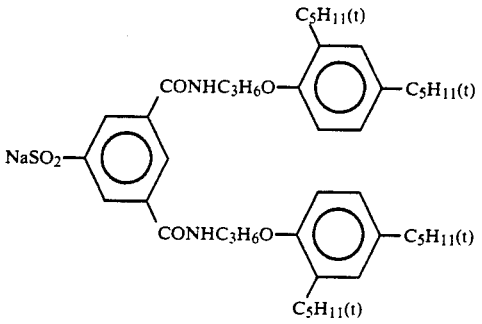
Cpd-11
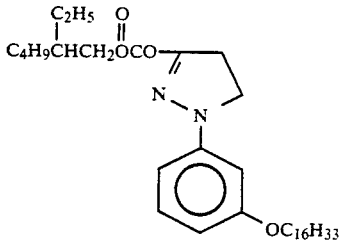
Cpd-12
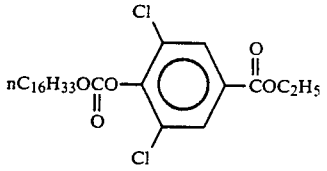
Cpd-13
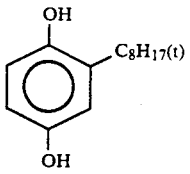
Cpd-14
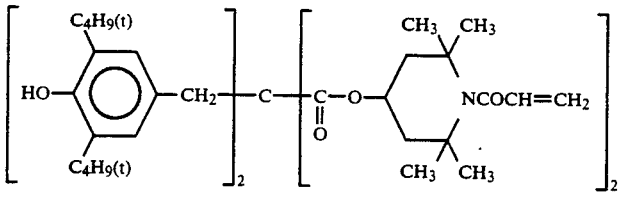
Cpd-15
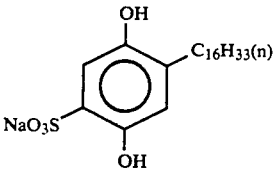

-continued
Cpd-16
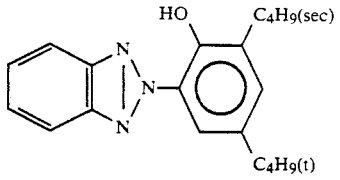
Cpd-17
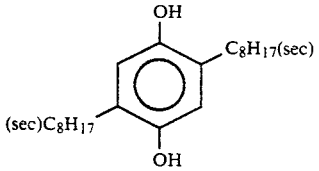
Cpd-18
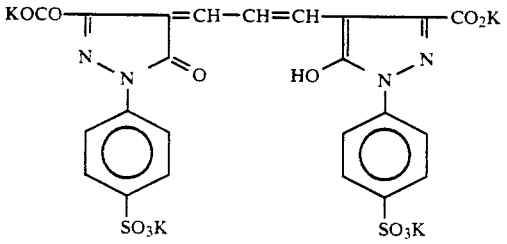
Cpd-19
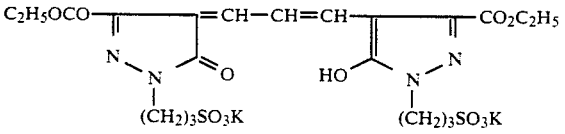
Cpd-20
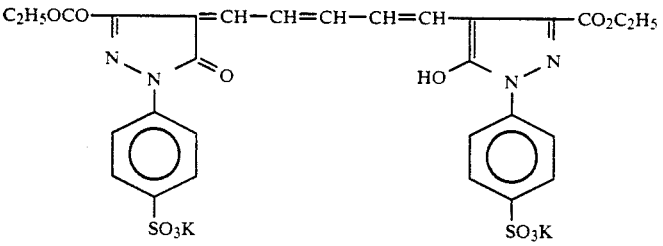
Cpd-21
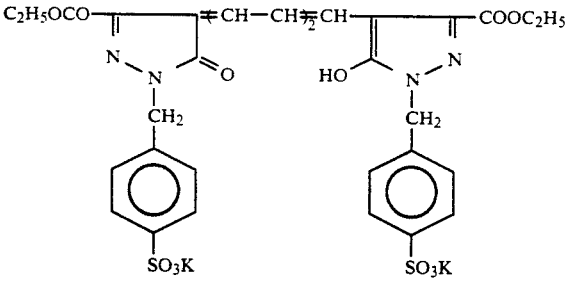
Cpd-22
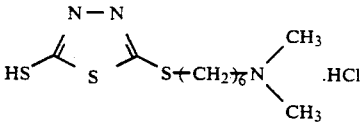
Cpd-23
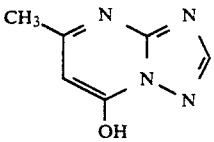

-continued
Cpd-24
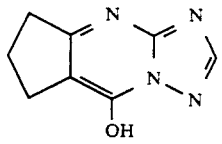
Cpd-25
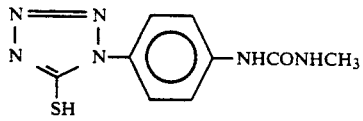
Cpd-26
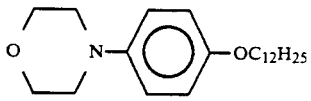
Cpd-27
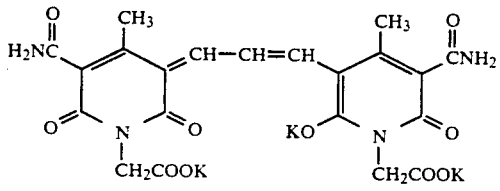
ExC-1
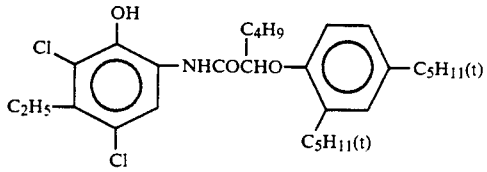
ExC-2
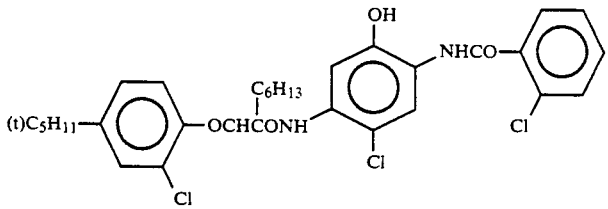
ExM-1
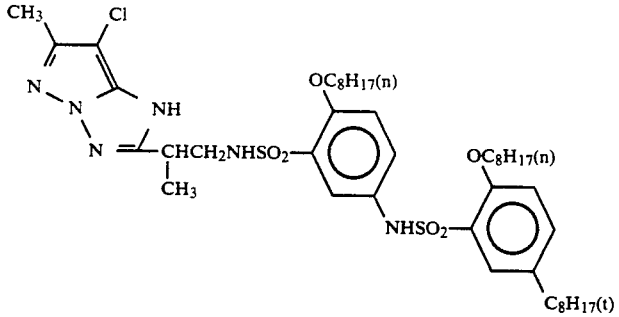
ExM-2
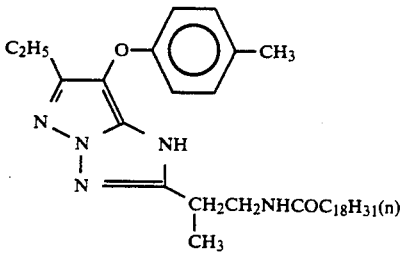

-continued

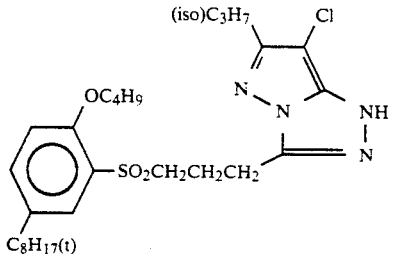

ExM-3

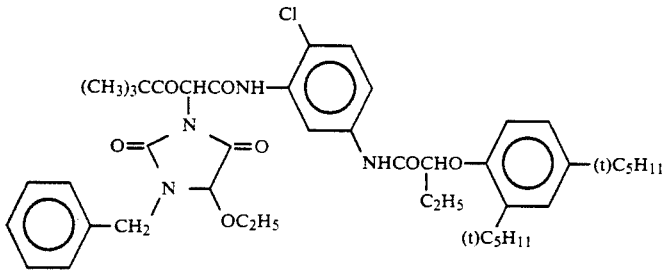

ExY-1

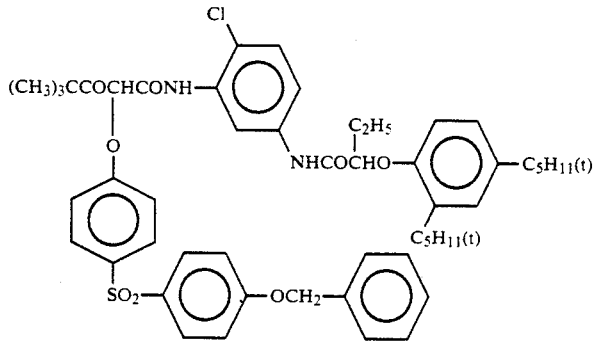

ExY-2

Solv-1: Di(2-ethylhexyl) Sebacate
Solv-2: Trinonyl Phosphate
Solv-3: Di(3-methylhexyl) Phthalate
Solv-4: Tricresyl Phosphate
Solv-5: Dibutyl Phthalate
Solv-6: Trioctyl Phosphate
Solv-7: Di(2-ethylhexyl) Phthalate
H-1: 1,2-Bis(vinylsulfonylacetamido)ethane
H-2: 4,6-Dichloro-2-hydroxy-1,3,5-triazine Sodium Salt
ExZK-1: 7-[3-(5-mercaptotetrazol-1-yl)benzamido]-10-propargyl-1,2,3,4-tetrahydroacridinium Perchlorate Samples Nos. 1 to 10 were incubated under the condition of 50° C. and 55% RH for 7 days. Each of the non-incubated samples and incubated samples was wedgewise exposed in an ordinary manner (color temperature 3200° K., 0.1 second, 100 CMS) and processed in accordance with the following processing procedure (A). The cyan color image density of each of the thus processed samples was measured, and the sensitivity of each sample was obtained from the exposure amount of giving the cyan color density of 0.6. The relative sensitivity of each of the incubated samples was then obtained on the basis of the sensitivity of the non-incubated sample of being 100. The results obtained are shown in Table 1 below:

| Processing Procedure (A): | | |
|---|---|---|
| Processing Steps | Time | Temperature |
| Color Development | 135 sec | 38° C. |
| Bleach-Fixation | 40 sec | 33° C. |

-continued

| Processing Procedure (A): | | |
|---|---|---|
| Processing Steps | Time | Temperature |
| Rinsing (1) | 40 sec | 33° C. |
| Rinsing (2) | 40 sec | 33° C. |
| Drying | 30 sec | 80° C. |

In procedure (A), rinsing was effected by a so-called countercurrent replenishment system where the replenisher was added to the rinsing bath (2) and the overflown liquid from the rinsing bath (2) was introduced into the rinsing bath (1), whereupon the amount of the carryover of the bleach-fixing solution from the bleach-fixing bath to the rinsing bath (1) along with the photographic material being processed was 35 ml/m$^2$, and the magnification of the rinsing replenisher to the carryover of the bleach-fixing solution was 9.1 times.

The processing solutions used above had the following compositions.

| Color Developer: | |
|---|---|
| D-sorbitol | 0.15 g |
| Sodium Naphthalenesulfonate/Formalin Condensate | 0.15 g |
| Ethylenediamine-Tetrakismethylene-phosphonic Acid | 1.5 g |
| Diethylene Glycol | 12.0 ml |
| Benzyl Alcohol | 13.5 ml |
| Potassium Bromide | 0.70 g |
| Benzotriazole | 0.003 g |
| Sodium Sulfite | 2.4 g |

-continued

| | |
|---|---|
| N,N-bis(carboxymethyl)hydrazine | 4.0 g |
| D-glucose | 2.0 g |
| Triethanolamine | 6.0 g |
| N-ethyl-N-(β-methanesulfonamidoethyl)-3-methyl-4-aminoaniline Sulfate | 30.0 g |
| Brightening Agent (diaminostilbene compound) | 1.0 g |
| Water to make | 1000 ml |
| pH (25° C.) | 10.25 |
| Bleach-Fixing Solution: | |
| Disodium Ethylenediaminetetra-acetate Dihydrate | 2.0 g |
| Ammonium Ethylenediaminetetra-acetato/Fe(III) Dihydrate | 70.0 g |
| Ammonium Thiosulfate (700 g/liter) | 180 ml |
| Sodium p-toluenesulfinate | 45.0 g |
| Sodium Bisulfite | 35.0 g |
| 5-Mercapto-1,3,4-triazole | 0.5 g |
| Ammonium Nitrate | 10.0 g |
| Water to make | 1000 ml |
| pH (25° C.) | 6.10 |

Rinsing Water

City water was passed through a mixed bed column filled with H-type strong acidic cation-exchange Resin (Amberlite IR-120B, by Rhom & Haas) and OH-type anion-exchange resin (Amberlite IR-400, by Rhom & Haas) whereby the calcium ion concentration and magnesium ion concentration were reduced to 3 mg/liter or less, respectively. Subsequently, 20 mg/liter of sodium dichloroisocyanurate and 0.15 g/liter of sodium sulfate were added to the water. The resulting solution had a pH value falling within the range of from 6.5 to 7.5.

TABLE 1

| Sample No. | Compound of Formula (I) | Relative Sensitivity After Incubation | |
|---|---|---|---|
| 1 | — | 160 | Comp. Ex. |
| 2 | I-1 | 130 | Invention |
| 3 | I-3 | 125 | " |
| 4 | I-5 | 135 | " |
| 5 | I-7 | 130 | " |
| 6 | I-10 | 130 | " |
| 7 | I-2 | 135 | " |
| 8 | I-15 | 130 | " |
| 9 | I-17 | 135 | " |
| 10 | I-16 | 135 | " |

As shown in Table 1, Samples Nos. 2 to 10 each containing a compound of the invention were superior to Comparative Sample No. 1 which did not contain a compound of the present invention, as the variation of the sensitivity to be caused by incubation was smaller.

EXAMPLE 2

The same process as in Example 1 was repeated, except that the yellow coupler in the 11th and 12th layers was replaced by the following compound and that the N-ethyl-N-(β-methanesulfonamidoethyl)-3-methyl-4-aminoaniline sulfate in the color developer was replaced by N-ethyl-N-hydroxyethyl-4-aminoaniline sulfate, and the same results were obtained.

Yellow Coupler:

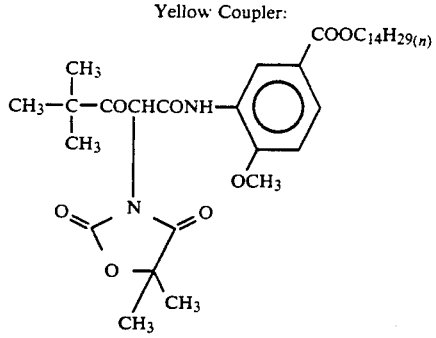

EXAMPLE 3

Emulsions (A-1) to (A-3) were prepared in the same manner as in the preparation of (Em-1), except that a metal ion compound as indicated in Table 2 below was used.

TABLE 2

| Emulsion | Metal Ion Compound | Amount Added (mol/mol of Ag) | Time of Addition |
|---|---|---|---|
| A-1 | Lead Acetate | $5.5 \times 10^{-5}$ | during formation of cores |
| A-2 | Ammonium rhodium(III) Chloride | $1.5 \times 10^{-7}$ | during formation of shells |
| A-3 | Potassium Iridium(III) Chloride | $3.5 \times 10^{-6}$ | during formation of shells |
| A-4 | Lead Acetate | $5.0 \times 10^{-5}$ | during formation of cores |
| | Ammonium rhodium(III) Chloride | $2.5 \times 10^{-7}$ | during formation of shells |
| A-5 | Lead Acetate | $5.6 \times 10^{-5}$ | during formation of shells |
| | Ammonium Rhodium(III) Chloride | $2.5 \times 10^{-6}$ | during formation of cores |

Photographic material samples were prepared in the same manner as in Example 1, except that each of Emulsions (A-1) to (A-5) was added to the 3rd, 6th and 11th layers as indicated in Table 3 below and that a compound of formula (I) was added to the 3rd, 6th and 11th layer also as indicated in the same Table 3.

These samples were incubated under the conditions of a temperature of 50° C. and a humidity of 55% RH for 10 days and then exposed and processed in the same manner as in Example 1. The magenta color density of each of the processed samples was measured.

TABLE 3

| Sample No. | Emulsion | Compound of Formula (I)(*) | Variation of Maximum Density(**) |
|---|---|---|---|
| 1 | Em-1 | — | −0.30 |
| 2 | " | I-10 | −0.20 |
| 3 | " | I-1 | −0.22 |
| 4 | A-1 | — | −0.25 |
| 5 | " | I-1 | −0.08 |
| 6 | " | I-2 | −0.08 |
| 7 | A-2 | — | −0.26 |
| 8 | " | I-1 | −0.09 |
| 9 | " | I-17 | −0.10 |
| 10 | A-3 | — | −0.27 |
| 11 | " | I-9 | −0.05 |
| 12 | " | I-10 | −0.08 |
| 13 | A-4 | — | −0.28 |
| 14 | " | I-14 | −0.07 |
| 15 | " | I-16 | −0.07 |
| 16 | A-5 | — | −0.29 |
| 17 | " | I-15 | −0.05 |
| 18 | " | I-18 | −0.06 |

(*)Amount Added: $5 \times 10^{-5}$ mol/m$^2$
(**)Amount varied after incubation to the density before incubation Sample Nos. 2, 3, 5, 6, 8, 9, 11, 12, 14, 15, 17 and 18 each containing compounds of formula (I) of the invention were all superior to the other samples as the lowering of the maximum density of the images as formed after incubation was smaller. In particular, the effect was remarkable in emulsions (A-1) to (A-5) containing metal ion(s).

EXAMPLE 4

The same process as in Example 1 was repeated, except that the following substance (ExZK-2) was added to each light-sensitive layer in an amount of $1.5\times10^{-5}$ mol, in addition to the nucleating agent ExZK-1.

The same results were obtained but the effect was somewhat smaller.

ExZK-2

1-Formyl-2-{4-[3-{3-[3-(5-mercaptotetrazol-1-yl)phenyl]ureido}benzenesulfonamido]phenyl}hydrazine While the invention has been described in detail and with reference to specific embodiments thereof, it will be apparent to one skilled in the art that various changes and modifications can be made therein without departing from the spirit and scope thereof.

What is claimed is:

1. A direct positive photographic material comprising a support having provided thereon at least one photographic emulsion layer containing previously non-fogged internal latent image-type silver halide grains, wherein the photographic emulsion layer contains at least one compound of formula(I):

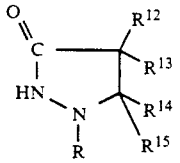

(I)

wherein $R^{11}$ represents an unsubstituted or substituted aryl group; $R^{12}$ to $R^{15}$, which may be the same or different, each represents a hydrogen atom, an unsubstituted or substituted aliphatic group or an unsubstituted or substituted aromatic group; and wherein $R^{12}$ and $R^{14}$ or $R^{15}$ and $R^{11}$ may be bonded to each other to form ring(s) wherein the ring(s) are 5-membered to 8-membered carbon rings and/or hetero ring.

2. The direct positive photographic material as in claim 1, wherein the amount of compound(s) of formula (I) present in the emulsion layer is from $1\times10^{-7}$ mol/m$^2$ to $1\times10^{-2}$ mol/m$^2$.

3. The direct positive photographic material as in claim 1, wherein the internal latent image-type silver halide grains are silver bromide, silver chloride, silver iodobromide, silver chlorobromide or silver chloroiodobromide grains and contain at least one metal selected from the group comprising manganese, copper, zinc, cadmium, rhenium, lead, bismuth, indium, thallium, zirconium, lanthanum, chromium, mercury and metals of Group VIII of the Periodic Table.

4. The direct positive photographic material as in claim 3, wherein the amount of the metal(s) present in the grains is from $10^{-9}$ to $10^{-2}$ mol per mol of silver halide.

5. The direct positive photographic material as in claim 1, wherein said emulsion layer comprises at least one blue-sensitive emulsion layer, at least one green-sensitive emulsion layer and at least one red-sensitive emulsion layer on a support and contains at least one color image-forming coupler.

6. The direct positive photographic material as in claim 1, further comprising at least one nucleating agent of formula (N-I) or (N-II):

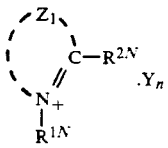

(N-I)

wherein $Z_1$ represents an unsubstituted or substituted non-metallic atomic group necessary for forming a 5-membered or 6-membered hetero ring, $R^{1N}$ represents an unsubstituted or substituted aliphatic group; $R^{2N}$ represents a hydrogen atom, or an unsubstituted or substituted aliphatic or aromatic group, or $R^{2N}$ may be bonded to the hetero ring to be completed by $Z_1$ to form a ring; provided that at least one of $R^{1N}$, $R^{2N}$ and $Z_1$ contain an alkynyl group, an acyl group, a hydrazine group or a hydrazone group, or $R^{1N}$ and $R^{2N}$ together form a ring to complete a dihydropyridinium skeleton, and at least one of $R^{1N}$, $R^{2N}$ and $Z^1$ may contain a group of accelerating adsorption of the compound to silver halide grains; Y represents a pair ion for satisfying the charge balance of the compound; and n represents 0 or 1;

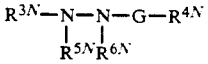

(N-II)

wherein $R^{3N}$ represents an unsubstituted or substituted aliphatic, aromatic or heterocyclic group; $R^{4N}$ represents a hydrogen atom, or an unsubstituted or substituted alkyl, aralkyl, aryl, alkoxy, aryloxy or amino group; G represents an unsubstituted or substituted carbonyl group, an unsubstituted or substituted sulfonyl group, an unsubstituted or substituted sulfoxy group, an unsubstituted or substituted phosphoryl group or an unsubstituted or substituted iminomethylene group; $R^{5N}$ and $R^{6N}$ are both hydrogen atoms, or one of them represents a hydrogen atom and the other represents an unsubstituted or substituted alkylsulfonyl, arylsulfonyl or acyl groups; provided that G, $R^{4N}$ and $R^{6N}$ form a hydrazone structure along with the hydrazine nitrogen in the formula.

7. The direct positive photographic material as in claim 6, which further contains a nucleation-accelerator along with the nucleating agent.

8. The direct positive photographic material as in claim 1, wherein the amount of compound(s) of formula (I) present in the emulsion layer is from $5\times10^{-7}$ mol/m$^2$ to $1\times10^{-3}$ mol/m$^2$.

9. The direct positive photographic material as in claim 1, wherein the amount of compound(s) of formula (I) present in the emulsion layer is from $5\times10^{-7}$ mol/m$^2$ to $1\times10^{-4}$ mol/m$^2$.

10. The direct positive photographic material as in claim 3, wherein the amount of metal(s) present in the grains is from $10^{-8}$ to $10^{-3}$ per mol of silver halide.

* * * * *